United States Patent
Sakamoto

(10) Patent No.: US 9,965,854 B2
(45) Date of Patent: May 8, 2018

(54) MEDICAL IMAGE PROCESSING APPARATUS, MEDICAL IMAGE PROCESSING METHOD, AND COMPUTER-READABLE MEDIUM

(71) Applicant: CANON KABUSHIKI KAISHA, Tokyo (JP)

(72) Inventor: Tsuyoshi Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 15/058,015

(22) Filed: Mar. 1, 2016

(65) Prior Publication Data

US 2016/0260214 A1    Sep. 8, 2016

(30) Foreign Application Priority Data

Mar. 3, 2015 (JP) ................. 2015-041183

(51) Int. Cl.
*G06T 7/00* (2017.01)
*G06T 7/62* (2017.01)

(52) U.S. Cl.
CPC ......... *G06T 7/0012* (2013.01); *G06T 7/62* (2017.01); *G06T 2207/30101* (2013.01); *G06T 2207/30172* (2013.01)

(58) Field of Classification Search
USPC ........................................... 382/128
See application file for complete search history.

(56) References Cited

U.S. PATENT DOCUMENTS

| 8,437,520 | B2 * | 5/2013 | Manabe | G06K 9/4638 |
| | | | | 382/128 |
| 8,538,105 | B2 * | 9/2013 | Masumoto | G06T 7/0012 |
| | | | | 378/4 |
| 8,649,844 | B2 * | 2/2014 | Masumoto | A61B 6/503 |
| | | | | 600/407 |
| 8,994,720 | B2 * | 3/2015 | Masumoto | G06T 19/00 |
| | | | | 345/419 |
| 9,123,163 | B2 * | 9/2015 | Hirano | G06T 15/08 |
| 9,406,160 | B2 * | 8/2016 | Tsukagoshi | A61B 6/466 |
| 2016/0078677 | A1 * | 3/2016 | Igarashi | A61B 6/504 |
| | | | | 382/131 |

FOREIGN PATENT DOCUMENTS

JP    2014-100297 A    6/2014

* cited by examiner

*Primary Examiner* — Ishrat I Sherali
(74) *Attorney, Agent, or Firm* — Canon USA, Inc. I.P. Division

(57) ABSTRACT

A medical image processing apparatus includes a core line identifying unit that identifies a core line of a predetermined region of a tubular structure from medical three-dimensional image data, a center position identifying unit that identifies a center position of the tubular structure from a plurality of points forming the core line identified by the core line identifying unit, an obtaining unit that obtains positions where straight lines intersecting at the center position and the tubular structure in the medical three-dimensional image data are in contact with each other, and a calculating unit that calculates a length of the tubular structure based on the positions obtained by the obtaining unit.

15 Claims, 7 Drawing Sheets

MEDICAL IMAGE PROCESSING APPARATUS, MEDICAL IMAGE PROCESSING METHOD, AND COMPUTER-READABLE MEDIUM

BACKGROUND

Field

Aspects of the present invention generally relate to a medical image processing apparatus, a medical image processing method, and a program installable in a medical image processing apparatus.

Description of the Related Art

In recent years, treatments within the blood vessel using a stent graft have been popularly performed, and a stent graft has been applied widely to treat a narrowing or an aneurysm of the coronary artery and the carotid artery, such as an abdominal aortic aneurysm. Thus, minimally invasive treatments with a catheter resulting in a minimal skin incision have become possible. Treatments using a stent graft may be greatly advantageous to patients from aspects of preservation of brain and renal functions and low cost of the treatments.

Such endovascular aneurysm repair may require predefining the length of the stent graft. Japanese Patent Laid-Open No. 2014-100297 discloses using an X-ray image data captured by using an X-ray diagnosis apparatus to calculate the length of a blood vessel from a starting point to an end point of a region where a stent graft is to be indwelled in consideration of a curvature thereof and present the result to a user.

Endovascular aneurysm repair which recently has started to be performed on a thoracic aortic aneurysm may require a stent graft having a length corresponding to the length of a greater curvature (outer circle) of the thoracic aorta so as to address a bending and a tortuosity of the thoracic aorta. In this case, because the thoracic aorta runs three dimensionally, the length of a greater curvature of the blood vessel may be required to be calculated three dimensionally. Japanese Patent Laid-Open No. 2014-100297 discloses calculating the length of a blood vessel in consideration of a curvature but does not specifically disclose how the length of a blood vessel in consideration of a curvature can be obtained, and it may not be said that the calculated length is highly reliable.

SUMMARY

According to an aspect of the present invention, there is provided a medical image processing apparatus including a core line identifying unit configured to identify a core line of a predetermined region of a tubular structure from medical three-dimensional image data, a center position identifying unit configured to identify a center position of the tubular structure from a plurality of points forming the core line identified by the core line identifying unit, an obtaining unit configured to obtain positions where straight lines intersecting at the center position and the tubular structure in the medical three-dimensional image data are in contact with each other, and a calculating unit configured to calculate a length of the tubular structure based on the positions obtained by the obtaining unit.

Further features of aspects of the present invention will become apparent from the following description of exemplary embodiments with reference to the attached drawings.

DESCRIPTION OF THE EMBODIMENTS

With reference to drawings, there will be described in detail a method for obtaining the length of a greater curvature or a lesser curvature of a tubular structure by using a medical three-dimensional image data generated from volume data (image data of a plurality of slices) photographed by a CT apparatus. A CT image photographed by a CT apparatus according to this embodiment shows a region of a thoracic aorta of a patient (subject) laid on a bed. According to this embodiment, a distance of a greater curvature part of the thoracic aorta (tubular structure) is calculated to determine the length of a stent indwelled in a thoracic aorta. However, aspects of the present invention are not limited to a blood vessel, such as a thoracic aorta, but may be a tubular structure of the bronchus, the large intestines, the small intestines, etc. While a method for obtaining the length of a blood vessel to be used for performing endovascular aneurysm repair according to this embodiment will be described below, the purpose for obtaining the length of a tubular structure obtained according to aspects of the present invention is not limited thereto. For example, the method may be applied for obtaining the length of a blood vessel necessary for performing an artificial blood vessel replacement.

Figure 1:
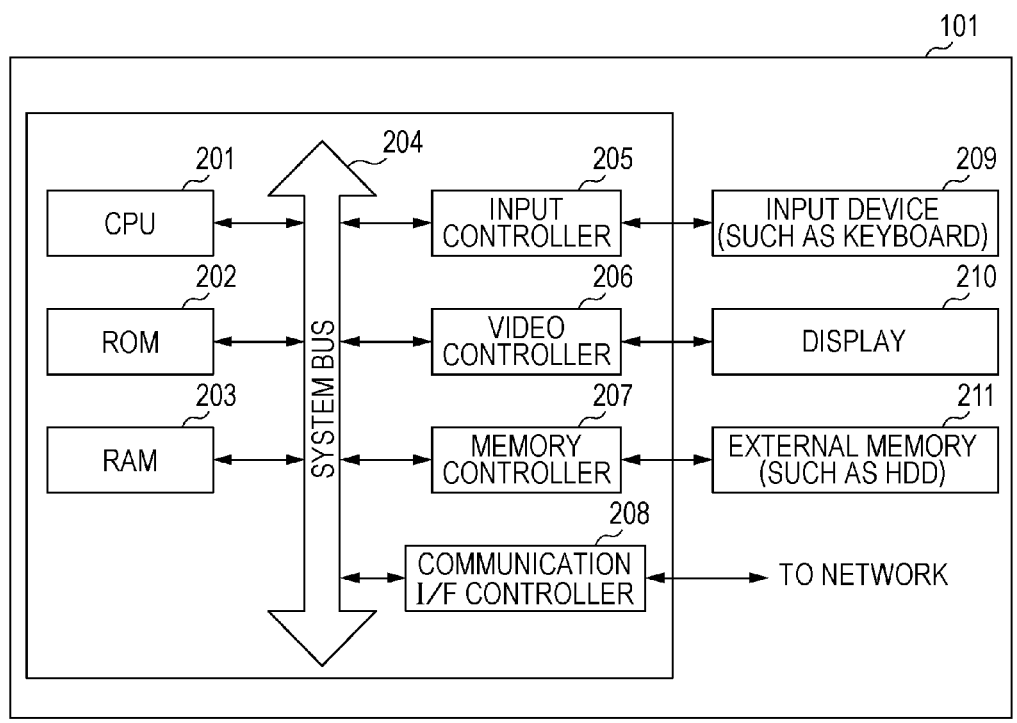
FIG. 1 illustrates an example of a hardware configuration of a medical image processing apparatus.

FIG. 1 illustrates an example of a hardware configuration of a medical image processing apparatus 101 (also called an information processing apparatus) according to this embodiment. The medical image processing apparatus 101 according to this embodiment obtains (reads) volume data (medical three-dimensional image data) generated based on image data photographed by a medical image diagnosis apparatus such as a CT apparatus and performs image processing thereon. The processing for generating medical three-dimensional image data may be performed by the medical image processing apparatus 101 or may be performed in advance by another processing apparatus.

A CPU 201 generally controls devices and controllers connected to a system bus 204.

A ROM 202 or an external memory 211 (storage unit) stores a BIOS (basic input/output system) and an operating system program (hereinafter, OS) which are control programs to be executed by the CPU 201 and programs for implementing functions executed by the medical image processing apparatus 101 as will be described below. A RAM 203 functions as a main memory and a work area for the CPU 201.

The CPU 201 loads a program necessary for execution of a process to the RAM 203 and executes the program to implement its corresponding action.

An input controller (input C) 205 controls an input from an input device 209 such as a keyboard and a pointing device such as a mouse, not illustrated.

A video controller (VC) 206 controls display on a display device such as a display 210. The type of display device assumed here is a CRT or a liquid crystal display, but it is not limited thereto.

A memory controller (MC) 207 controls accesses to the external memory 211 such as a hard disk (HD), a flexible disk (PD) or a card type memory connected to a PCMCIA card slot through an adapter for storing data of a boot program, browser software, an application, font data, a user file, an edited file, and so on.

A communication I/F controller (communication I/F C) 208 is communicably coupled to an external device such as a storage device which stores an image obtained by a medical image diagnosis apparatus such as a CT apparatus over a network and executions communication control processing over the network. For example, the communication I/F controller 208 may be used for Internet communications based on TCP/IP.

It should be noted that the CPU 201 performs rasterizing processing on outline font data for a display information region within the RAM 203 so that it can be displayed on the display 210.

The CPU 201 enables a user to instruct with a mouse cursor, not illustrated, for example, on the display 210.

A program which is used for execution of processes, which will be described below, by the medical image processing apparatus 101 according to aspects of the present invention is stored in the external memory 211 and is loaded to the RAM 203 as required so that it can be executed by the CPU 201.

A definition file and an information table usable by a program according to aspects of the present invention are also stored in the external memory 211.

Figure 2:
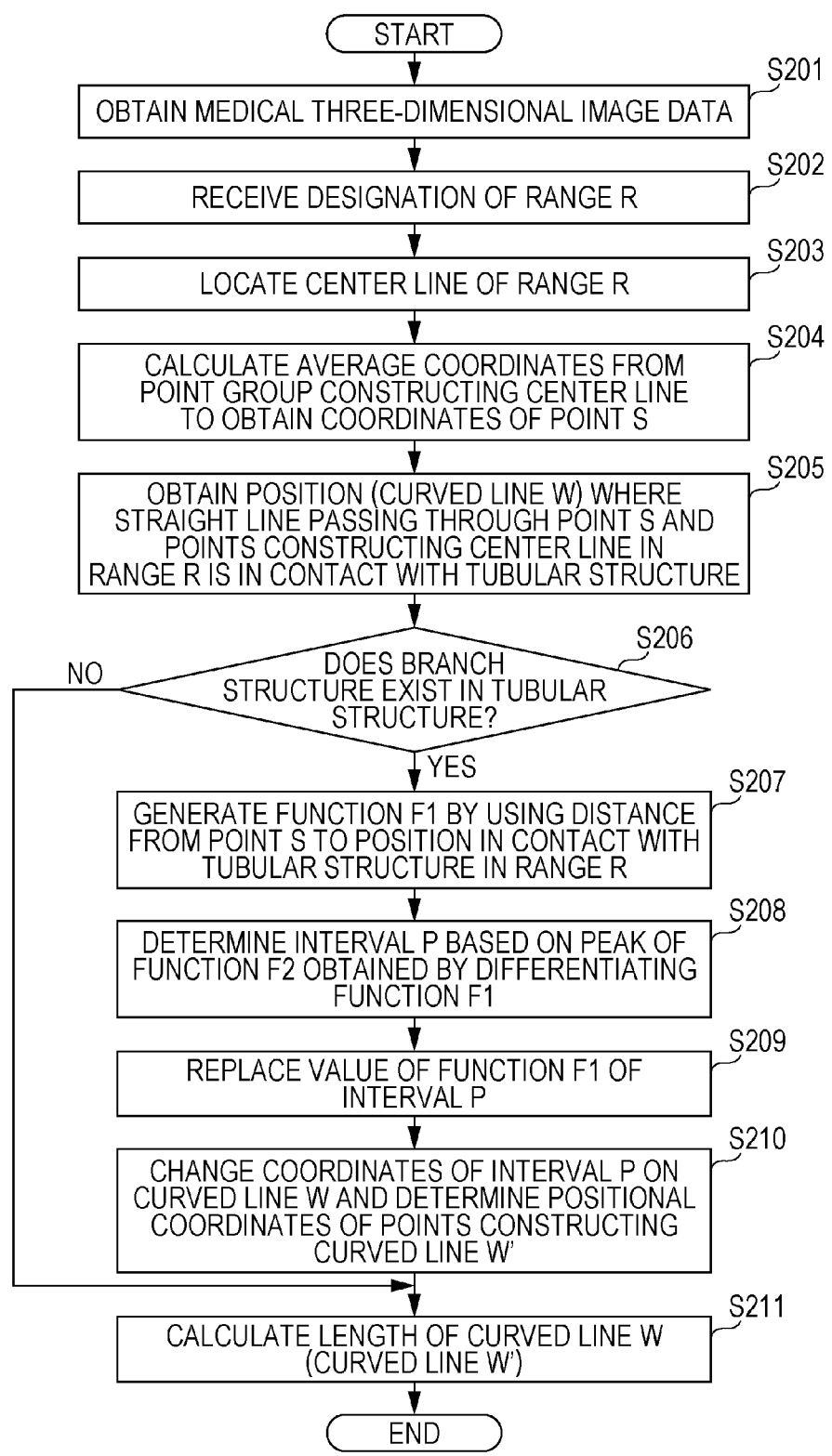
FIG. 2 is a flowchart illustrating a flow of medical image processing according to aspects of the present invention.

FIG. 2 is a flowchart illustrating a flow of medical image processing to be performed by the medical image processing apparatus 101 according to an embodiment of the present invention. The processing illustrated in the flowchart in FIG. 2 is implemented by a stored control program read and executed by the CPU 201 in the medical image processing apparatus 101. A case in which an aortic aneurysm 37 occurs in a curved region of a thoracic aorta as illustrated in FIGS. 3A and 3B to FIG. 7, for example, will be described below.

When an endovascular aneurysm repair is performed on a thoracic aorta, the length of a greater curvature part 33 may be required rather than the length of a stent graft determined based on a core line because a thoracic aorta has a bending and a tortuosity. A curved region of a thoracic aorta has three branchinas of a brachiocephalic trunk 34, a left common carotid artery branching 35 and a left subclavian artery 36.

In S201 in FIG. 2, the CPU 201 in the medical image processing apparatus 101, first of all, obtains CT image data obtained by a medical image diagnosis apparatus such as a CT apparatus from an external storage unit (not illustrated). Medical three-dimensional image data is generated for preparation which is image data containing three dimensional information generated based on the obtained CT image data. Alternatively, the corresponding medical three-dimensional image data which is generated and stored in advance may be obtained from an external storage unit (not illustrated).

In S202, the CPU 201 in the medical image processing apparatus 101 receives from a user a designation of a region in a range R from which the length in the medical three-dimensional image data needs to be extracted. The CPU 201 may receive such a designation of a region input through a drag of a mouse on an image displayed on a displayed device. It should be noted that such a region may be extracted automatically instead of receiving a designation input from a user.

Figure 3A:
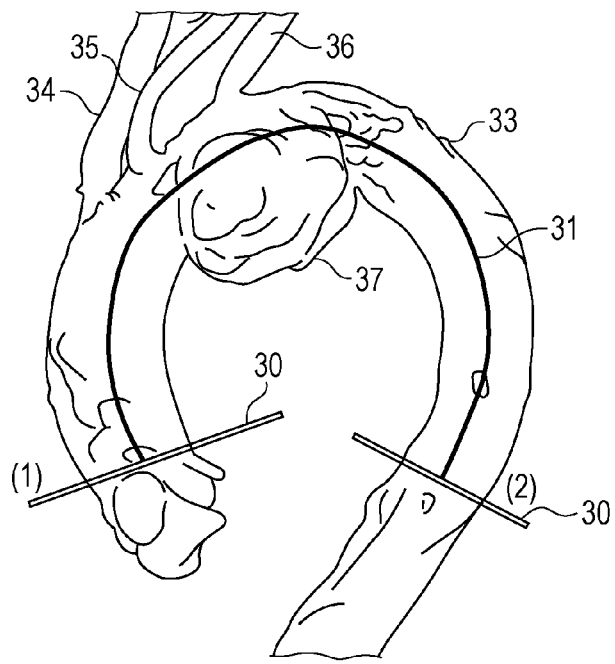
FIG. 3A is a schematic diagram for explaining identification of an extraction region of a thoracic aorta.

In S203, the CPU 201 in the medical image processing apparatus 101 identifies a core line in the range R (designated region) received in S202 based on the medical three-dimensional image data (core line identifying unit). More specifically, a core line 31 is identified by performing a thinning out process on a predetermined region of the medical three-dimensional image data. FIG. 3A illustrates a state that the core line 31 is identified based on a pair of positions 30 selected by the region designation operation through a drag of a mouse performed by a user.

Figure 3B:
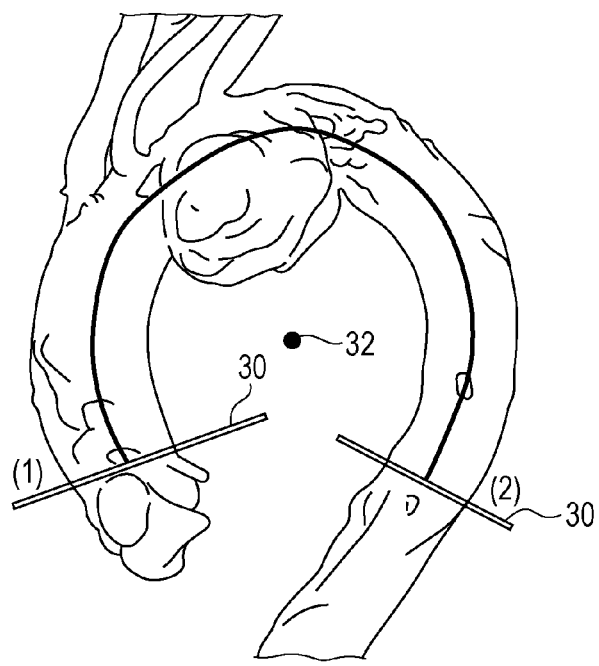
FIG. 3B is a schematic diagram illustrating a center point obtained from a core line of the thoracic aorta.

In S204, the CPU 201 in the medical image processing apparatus 101 calculates average coordinates from a plurality of points forming the core line 31 to obtain position coordinates of a center point 32 (center position) (center position identifying unit). FIG. 3B illustrates the position of the center point 32 obtained based on the plurality of points forming the core line 31.

Figure 4A:
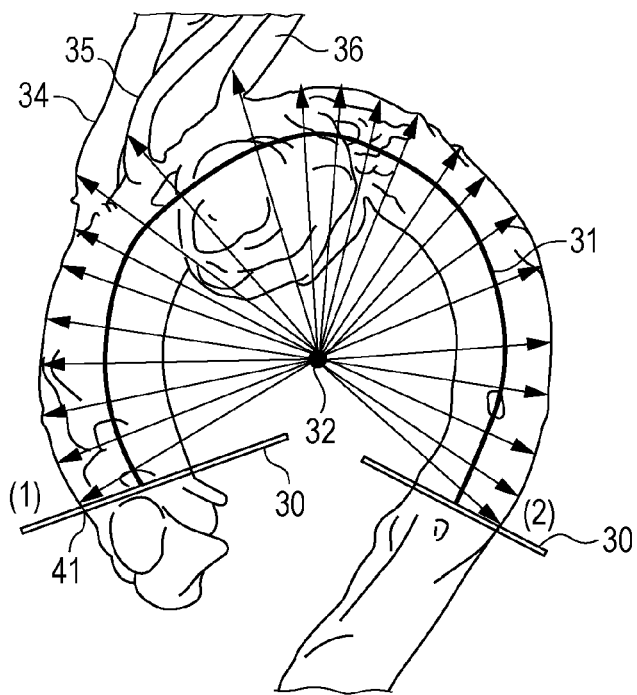
FIG. 4A is a schematic diagram for explaining how a point where a straight line connecting the center point and the core line is in contact with an outer wall of the thoracic aorta.

In S205, the CPU 201 in the medical image processing apparatus 101 obtains, for each of a plurality of points forming the core line 31, a position where a straight line connecting the center point 32 and the point forming the core line 31 in the range R and the greater curvature part 33 of the thoracic aorta (inner wall of the greater curvature of the thoracic aorta) in the medical three-dimensional image data are in contact with each other. In other words, a position where the straight line connecting the center point 32 and a point forming the core line 31 in the range R and an inner wall of a blood vessel (tubular structure) in the medical image three dimensional data are in contact with each other outside of the core line in a direction from the center position identified based on a set of points forming the core line to the core line is obtained for each of the points forming the core line. FIG. 4A illustrates a straight line 41 extending from the center point 32. Thus, a curved line W being the greater curvature part 33 can be obtained.

In order to obtain the length of a curved line W being a lesser curvature of a tubular structure instead of the greater curvature part 33, a position where a straight line connecting the center point 32 and a point, forming the core line 31 in the range R and an inner wall the tubular structure are in contact with each other between the core line of the tubular structure and the center position identified based on the set of points forming the core line may be obtained for each of the points forming the core line.

In S206, the CPU 201 in the medical image processing apparatus 101 determines whether a curved line W part of the tubular structure the length of which is to be calculated has a branching structure or not. The presence of a branching structure may be determined based on a designation from a user or may be determined based on the type of the subject tubular structure.

This is performed because when three branchings of the brachiocephalic trunk 34, the left common carotid artery branching 35 and the left subclavian artery 36 are present in a greater curvature part of a thoracic aorta, the length directly obtained from the curved line W may be influenced by those blood vessels and may possibly be incorrect. The length of a curved line W of a tubular structure without having other branching structures may be obtained based on coordinates of the curved line W obtained by the processing in S205.

If it is determined in S206 that the curved line W part of the tubular structure the length of which is to be calculated does not have a branching structure, the processing moves to S211 where the length of the tubular structure in a region corresponding to the designated range R is calculated from position coordinates of the set of points forming the curved line W. Then, the process ends.

According to this method, the length of a necessary part (greater curvature part or lesser curvature) of a tubular structure can be obtained with high reliability even though the tubular structure runs three three-dimensionally. The length can be automatically extracted by using three-dimensional image data of a designated region so that variations occurring when manual measurements are performed based on two-dimensional image data can be prevented.

On the other hand, if it is determined in S206 that the curved line W part of the tubular structure the length of which is to be calculated has a branching structure, the processing moves to S207 where processing is performed for removing an effect of the branching structure.

According to this embodiment, a curved line F1 (also called a function F1) is generated by plotting distances from the center point S in the range R to positions in contact with the tubular structure on an angle θ about the center point S as the axis of abscissae from the position (1) in the range R to the position (2) in the range R and is primary differentiated to generate a function F2. A range (interval P) defined with reference to peaks (points of inflection of the function F1) at both ends of the function F2 is determined as a region having a branching structure. Then, their effects are removed. The method for determining a region having a branching structure is not limited to the method according to this embodiment, a range in which the value of the function F2 is equal to or higher than a predetermined value (left side part of the left-most peak) or is lower than the predetermined value (the right side region of the right-most peak) may be determined as having a branching structure. A range with reference to the peak position of the function F1 may be determined as a region having a branching structure. This embodiment will be described with reference to an example in which three peaks are collectively identified to perform distance transform processing though the distance transform processing may be performed by identifying the peaks one by one.

Figure 4B:
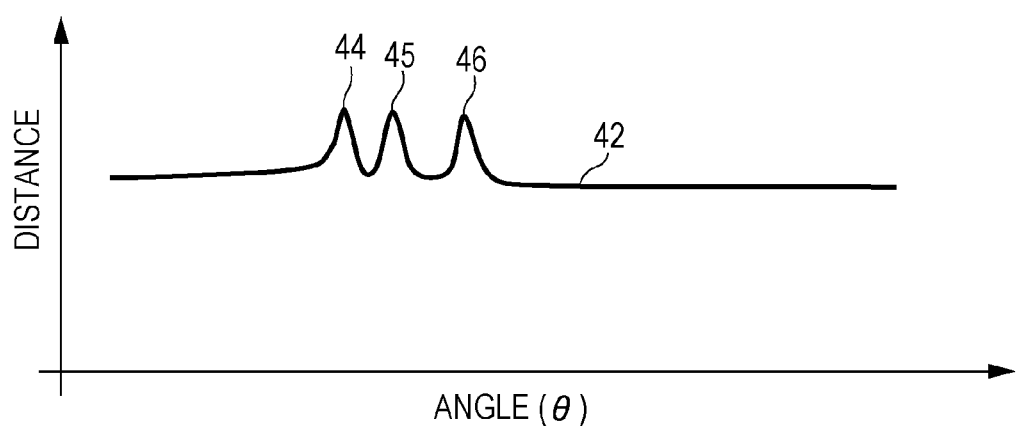
FIG. 4B illustrates a function (curve) obtained by plotting distances between the center point and the outer wall of the thoracic aorta.

First, in S207, the CPU 201 in the medical image processing apparatus 101 generates a function F1 by plotting distances from the center point S in the range R to positions in contact with the tubular structure on an angle θ about the center point S as the axis of abscissae from the position (1) in the range R to the position (2) in the range R. FIG. 4B illustrates an example of the generated function F1 (42). The function F1 has a peak 44 due to an effect of the brachiocephalic trunk 34, a peak 45 due to an effect of the left common carotid artery branching 35, and a peak 46 due to an effect of the left subclavian artery 36, as understood from FIG. 4A.

Figure 5A:
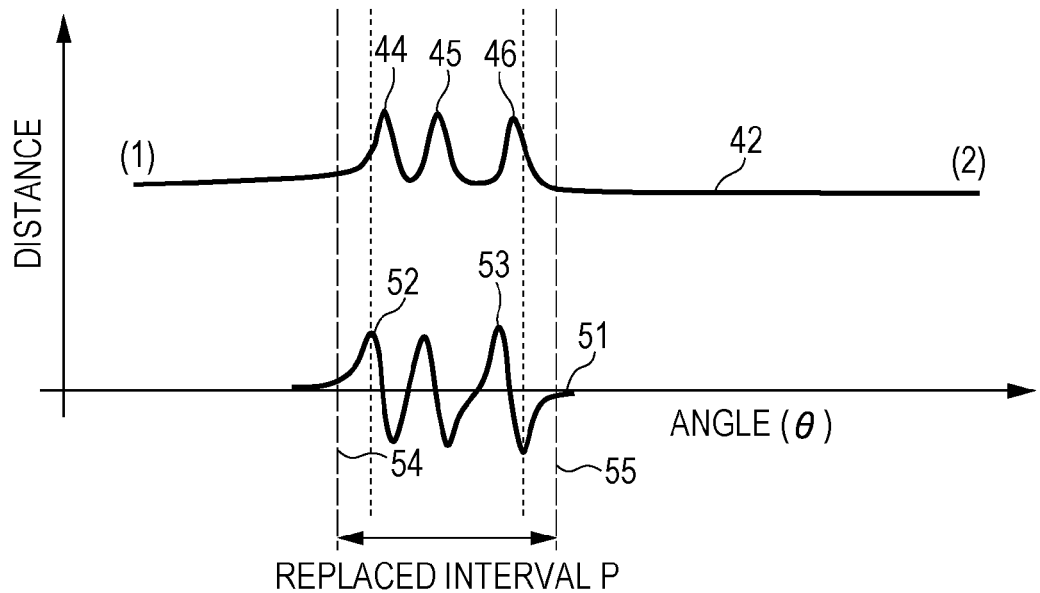
FIG. 5A illustrates another function obtained by performing a first derivation on the function.

In S208, the CPU 201 in the medical image processing apparatus 101 determines an interval P to be corrected in S209 based on the peaks of the function F2 (51) obtained by primary differentiation of the function F1 (42). FIG. 5A illustrates how the interval P is determined based on the function F2 (51) obtained by differentiation of the function F1 (42). According to this embodiment, the range defined by a position 54 at a predetermined amount (1) from the peak 52 of the function F2 showing a point of inflection on the left side of the left-most peak of the function F1 (42) and a position 55 at a predetermined amount (2) from the peak 53 of the function F2 showing a point of inflection on the right side of the right-most peak is determined as the interval P.

Figure 5B:
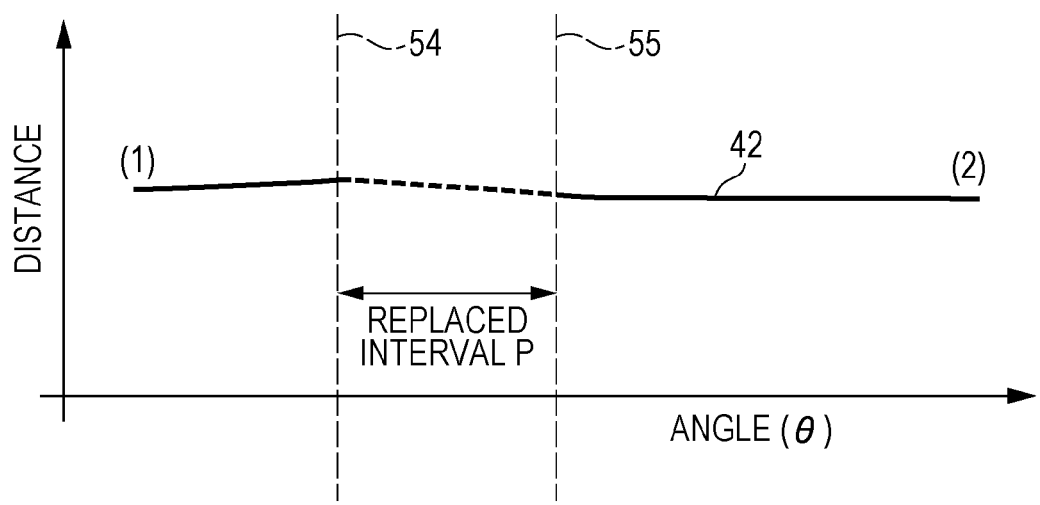
FIG. 5B illustrates a state obtained by replacement of the values of the function with respect to the region identified from the other function.

Next, in S209, the CPU 201 in the medical image processing apparatus 101 performs processing for replacing the values of the function F1 in the interval P. The values may be replaced by an average value of the value at the position 54 of the function F1 and the value at the position 55 by one operation, or as illustrated in FIG. 5B, values from the value of the function F1 at the position 54 to the value of the function F1 at the position 55 may be serially replaced.

Figure 6:
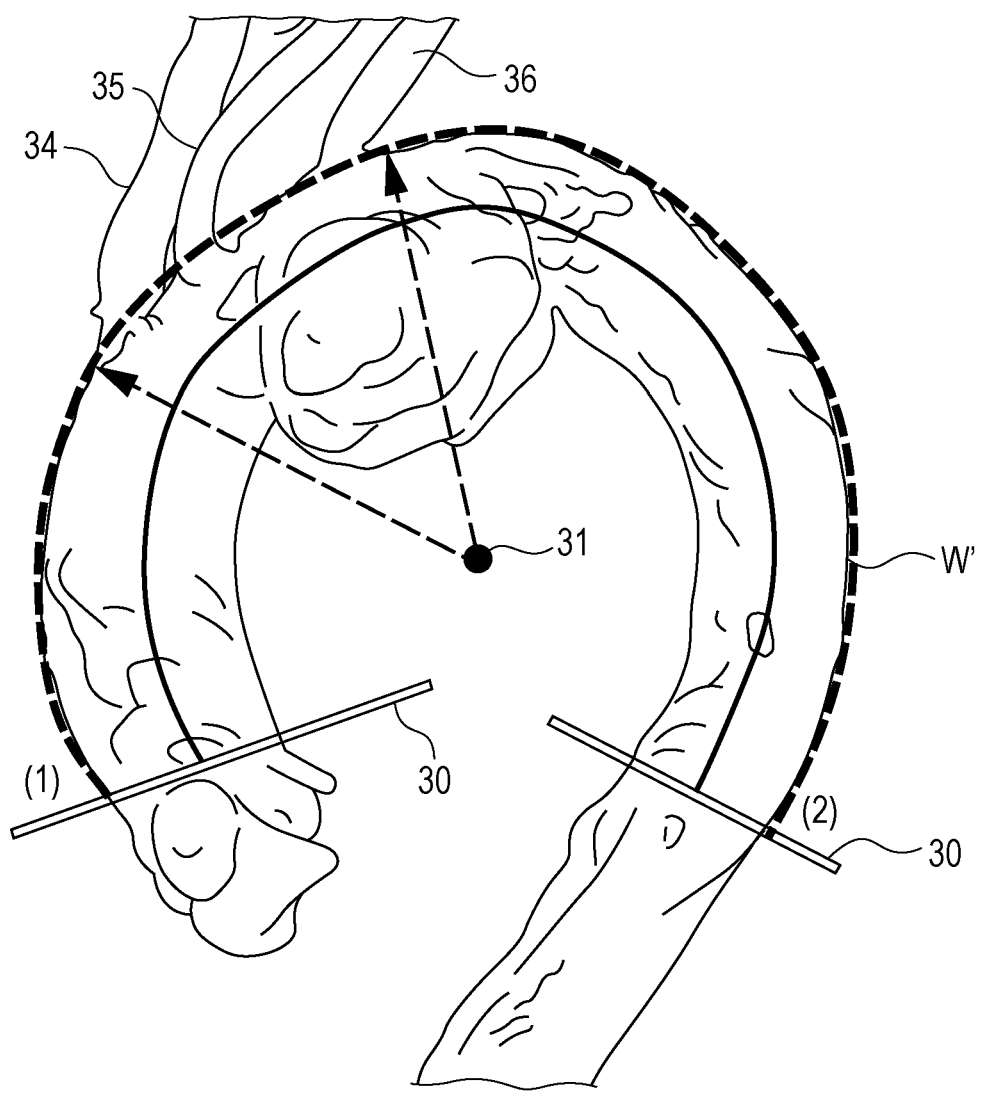
FIG. 6 is a schematic diagram illustrating a curved line generated by plotting positions at distances obtained based on the other function from the center point by on a vector connecting the center point and the core line over an image of the thoracic aorta.
Figure 7:
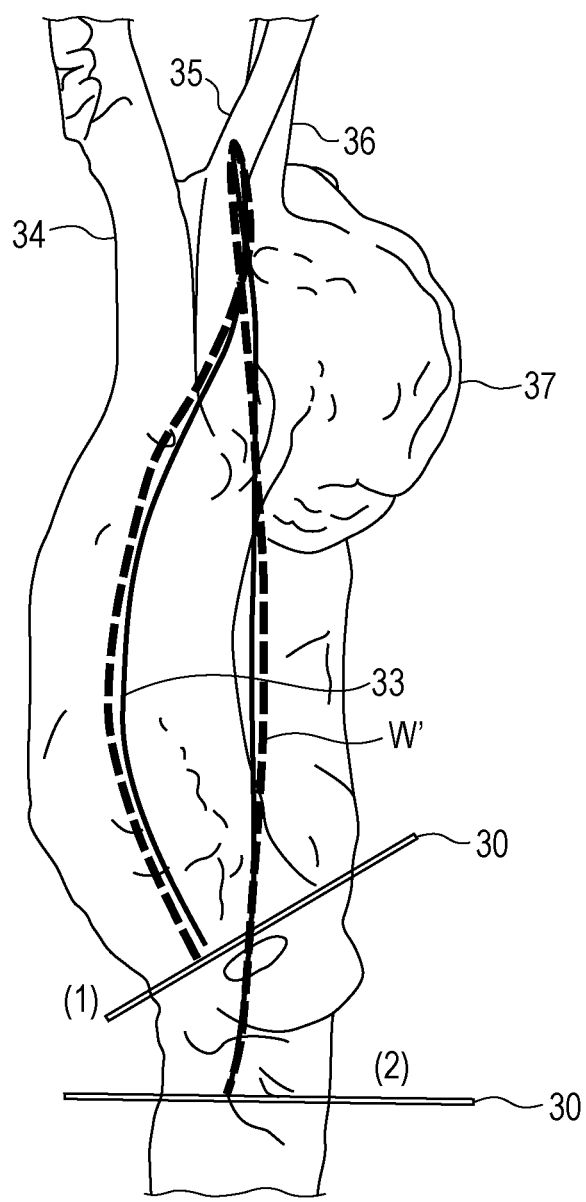
FIG. 7 illustrates a left view of the thoracic aorta illustrated in FIG. 6.

Next, in S210, the CPU 201 in the medical image processing apparatus 101 changes (corrects) position coordinates of points in the interval P of the curved line W to position coordinates determined by defining the center point S as the point of origin and the values replaced in S209 as distances of vectors connecting the center point S and the core line. The curved line determined based on the points at the changed position coordinates will be called a curved line W'. FIG. 6 illustrates the thus determined curved line W' over the thoracic aorta. FIG. 7 illustrates a left view of the thoracic aorta illustrated in FIG. 6. Therefore, performing the correction processing on the position coordinates can remove an effect of a branching structure if any.

In S211, the CPU 201 in the medical image processing apparatus 101 calculates the length of the tubular structure in the corresponding region in the designated range R from the position coordinates of the set of points forming the curved line W. Then, the processing ends.

As described above, in a case where a branching structure exists in a tubular structure, the correction may be performed to remove an effect of the branching structure in the tubular structure. Based on the position coordinates after the correction, the length of a desired region of the tubular structure can be calculated. Therefore, the length of a necessary part (greater curvature part or lesser curvature part) of a tubular structure which runs three dimensionally like a thoracic aorta, for example, and even has a branching structure midway can be obtained with high reliability (see FIG. 7). The length can be automatically extracted by using three-dimensional image data of a designated region so that variations occurring when manual measurements are performed based on two-dimensional image data can be prevented.

Having described medical three-dimensional image data generated from volume data photographed by a CT apparatus as an example, medical three-dimensional image data generated from volume data captured by other modality such as an MRI apparatus instead of a CT apparatus may be used.

Aspects of the present invention can be embodied as a system, an apparatus, a method, a program or a storage medium, for example. More specifically, it is applicable to a system including a plurality of apparatuses or an apparatus including one device.

An embodiment of the present invention can be also achieved by supplying a software program that implements a function of the aforementioned embodiment directly or remotely to the system or apparatus. An embodiment which is achieved by reading out and executing the supplied program code by an information processing apparatus in the system or apparatus is also included in an aspect of the present invention.

Therefore, aspects of the present invention can also be implemented by program code itself to be installed in the information processing apparatus for implementing function processing of aspects of the present invention in an information processing apparatus. In other words, aspects of the present invention may also include a computer program itself for implementing the function processing of aspects of the present invention.

In this case, aspects of the present invention may be embodied by object code, a program executed by an interpreter, script data supplied to an OS or the like if it has a function of the program.

The program may be supplied in a recording medium such as a flexible disk, a hard disk, an optical disk, a magneto-optical disk, an MO, a CD-ROM, a CD-R, and a CD-RW. The recording medium may further be a magnetic tape, a nonvolatile memory card, a ROM, a DVD (DVD-ROM, DVD-R) or the like.

In addition, the program may be supplied from a web site accessible over the Internet through a browser of a client computer. The computer program of aspects of the present invention itself or a compressed file of the computer program including an automatic install function may be downloaded to a recording medium such as a hard disk.

The program code of aspects of the present invention may be divided into a plurality of files so that the files can be downloaded from different web sites. In other words, aspects of the present invention further include a WWW server from which a plurality of users can download the program file for implementing the function processing of the aspects of the present invention in an information processing apparatus.

The program of the aspects of the present invention may be encrypted, be stored in a storage medium such as a CD-ROM and be distributed to a user. A user who satisfies a predetermined condition is allowed to download key information for solving the encryption from a web site over the Internet. By using the downloaded key information, the encrypted program may be executed to be installed in an information processing apparatus for implementation.

The functions of the aforementioned embodiments may be realized by an information processing apparatus by reading out and executing the program. In addition, an OS running on an information processing apparatus may implement a part or all of actual processes based on instructions from the program so that the processes can realize the functions of the aforementioned embodiments.

Furthermore, the program read out from a recording medium may be written in a memory provided in a function expanding board inserted to an information processing apparatus or a function expanding unit connected to an information processing apparatus. After that, a CPU provided in the function expanding board or function expanding unit may execute a part or all of actual processes based on instructions from the program so that the processes can realize the functions of the aforementioned embodiments.

It should be understood that the aforementioned embodiments are given only for purpose of illustration of specific examples for embodying aspects of the present invention, and it should not be interpreted that the technical scope of the aspects of the present invention is limited thereby. In other words, aspects of the present invention may be embodied in various forms without departing from the technical idea or main features of the aspects of the present invention.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-041183, filed Mar. 3, 2015, which is hereby incorporated by reference herein in its entirety.

What is claimed is:

1. A medical image processing apparatus comprising:
   a core line identifying unit configured to identify a core line of a predetermined region of a tubular structure from medical three-dimensional image data;
   a center position identifying unit configured to identify a center position of the tubular structure from a plurality of points forming the core line identified by the core line identifying unit;
   an obtaining unit configured to obtain positions where straight lines connecting the center position and the plurality of points forming the core line and the tubular structure in the medical three-dimensional image data are in contact with each other;
   a determination unit configured to determine whether the tubular structure includes a branching based on the positions obtained by the obtaining unit; and
   a calculating unit configured to correct a position on a structure branching from the tubular structure among the positions obtained by the obtaining unit and calculate a length of the tubular structure based on the positions obtained by the obtaining unit and the corrected positions in a case where the determination unit determines that the tubular structure includes a branching, and to calculate the length of the tubular structure based on the positions obtained by the obtaining unit in a case where the determination unit determines that the tubular structure includes no branching,
   wherein the calculating unit calculates a position or a length of an artificial material to be inserted into the tubular structure.

2. The medical image processing apparatus according to claim 1, wherein the obtaining unit obtains a position where the straight line and an inner wall of the tubular structure is in contact with each other outside of the core line in a direction from the center position to the core line.

3. The medical image processing apparatus according to claim 1, wherein the obtaining unit obtains a position where the straight line and an inner wall of the tubular structure are in contact with each other between the core line and the center position.

4. The medical image processing apparatus according to claim 1, further comprising a receiving unit configured to receive a designation of a predetermined region of the tubular structure.

5. The medical image processing apparatus according to claim 4, wherein the calculating unit calculates a length of the tubular structure in the predetermined region received by the receiving unit.

6. A medical image processing method comprising:
   identifying a core line of a predetermined region of a tubular structure from medical three-dimensional image data;
   identifying a center position of the tubular structure from a plurality of points forming the identified core line;
   obtaining positions where straight lines connecting the identified center position and the plurality of points forming the core line and the tubular structure in the medical three-dimensional image data are in contact with each other;

determining whether the tubular structure includes a branching based on the positions obtained by the obtaining step;
correcting a position on a structure branching from the tubular structure among the positions obtained by the obtaining step; and
calculating a length of the tubular structure based on the obtained positions obtained by the obtaining step and the corrected positions in a case where the determination step determines that the tubular structure includes a branching, and calculating the length of the tubular structure based on the positions obtained by the obtaining step in a case where the determination step determines that the tubular structure includes no branching,
wherein the calculating step calculates a position or a length of an artificial material to be inserted into the tubular structure.

7. A non-transitory computer-readable medium storing a program to be executed by a computer to perform a method for calculating a length of a predetermined region of a tubular structure from medical three-dimensional image data, the method comprising:
identifying a core line of a predetermined region of a tubular structure from medical three-dimensional image data;
identifying a center position of the tubular structure from a plurality of points forming the identified core line;
obtaining positions where straight lines connecting the identified center position and the plurality of points forming the core line and the tubular structure in the medical three-dimensional image data are in contact with each other;
determining whether the tubular structure includes a branching based on the positions obtained by the obtaining step;
correcting a position on a structure branching from the tubular structure among the positions obtained by the obtaining step; and
calculating a length of the tubular structure based on the obtained positions obtained by the obtaining step and the corrected positions in a case where the determination step determines that the tubular structure includes a branching, and calculating the length of the tubular structure based on the positions obtained by the obtaining step in a case where the determination step determines that the tubular structure includes no branching,
wherein the calculating step calculates a position or a length of an artificial material to be inserted into the tubular structure.

8. The medical image processing apparatus according to claim 1, wherein the calculating unit is configured to correct the position by excluding, as a position on the structure branching from the tubular structure, the position in a range defined with reference to a point of inflection in a function indicating a relation between distances from the center position to the positions in contact with the tubular structure among the positions and an angle from the positions to the center position.

9. The medical image processing apparatus according to claim 8, wherein the calculating unit is configured to calculate the length of the tubular structure by complementing the position excluded in the function.

10. The medical image processing apparatus according to claim 1, wherein the artificial material is a part of, or is, a stent graft or an artificial blood vessel.

11. A medical image processing apparatus comprising:
a core line identifying unit configured to identify a core line of a predetermined region of a tubular structure from medical three-dimensional image data;
a center position identifying unit configured to identify a center position of the tubular structure from a plurality of points forming the core line identified by the core line identifying unit;
an obtaining unit configured to obtain positions where straight lines connecting the center position and the plurality of points forming the core line and the tubular structure in the medical three-dimensional image data are in contact with each other, wherein the positions are positions where the straight lines and an inner wall of the tubular structure are in contact with each other outside of the core line in a direction from the center position to the core line;
a position identifying unit configured to identify a position on a structure branching from the tubular structure among the positions obtained by the obtaining unit; and
a calculating unit configured to calculate a length of a stent graft to be inserted into the tubular structure by excluding the identified position among the positions obtained by the obtaining unit and complementing the excluded position.

12. A medical image processing apparatus comprising:
a core line identifying unit configured to identify a core line of a predetermined region of a tubular structure from medical three-dimensional image data;
a reference position identifying unit configured to identify a reference position of the tubular structure from a plurality of points forming the core line identified by the core line identifying unit;
an obtaining unit configured to obtain positions where straight lines connecting the center position and the plurality of points forming the core line and the tubular structure in the medical three-dimensional image data are in contact with each other, wherein the positions are positions where the straight lines and an inner wall of the tubular structure are in contact with each other outside of the core line in a direction from the reference position to the core line;
a position identifying unit configured to identify a position on a structure branching from the tubular structure among the positions obtained by the obtaining unit; and
a calculating unit configured to calculate a length of a stent graft to be inserted into the tubular structure by excluding the identified position among the positions obtained by the obtaining unit and complementing the excluded position.

13. The medical image processing apparatus according to claim 12, wherein the reference position is within a circle including an arc in a case where the tubular structure is regarded as the arc.

14. A medical image processing method comprising:
identifying a core line of a predetermined region of a tubular structure from medical three-dimensional image data;
identifying a center position of the tubular structure from a plurality of points forming the identified core line;
obtaining positions where straight lines connecting the center position and the plurality of points forming the core line and the tubular structure in the medical three-dimensional image data are in contact with each other, wherein the positions are positions where the straight lines and an inner wall of the tubular structure are in contact with each other outside of the core line in a direction from the center position to the core line;

identifying a position on a structure branching from the tubular structure among the obtained positions; and calculating a length of a stent graft to be inserted into the tubular structure by excluding the identified position among the obtained positions and complementing the excluded position.

15. A non-transitory computer-readable medium storing a program to be executed by a computer to perform a method, the method comprising:

identifying a core line of a predetermined region of a tubular structure from medical three-dimensional image data;

identifying a center position of the tubular structure from a plurality of points forming the identified core line;

obtaining positions where straight lines connecting the center position and the plurality of points forming the core line and the tubular structure in the medical three-dimensional image data are in contact with each other, wherein the positions are positions where the straight lines and an inner wall of the tubular structure are in contact with each other outside of the core line in a direction from the center position to the core line;

identifying a position on a structure branching from the tubular structure among the obtained positions; and calculating a length of a stent graft to be inserted into the tubular structure by excluding the identified position among the obtained positions and complementing the excluded position.

* * * * *